United States Patent
Caliguri et al.

(10) Patent No.: US 9,094,821 B2
(45) Date of Patent: Jul. 28, 2015

(54) METHOD AND SYSTEM FOR ACTIVATION OF PERFORMANCE ENHANCEMENTS FOR MOBILE DEVICES

(75) Inventors: Steven J. Caliguri, Poway, CA (US); Steven C. Thompson, San Diego, CA (US)

(73) Assignee: Acorn Technologies, Inc., La Jolla, CA (US)

( * ) Notice: Subject to any disclaimer, the term of this patent is extended or adjusted under 35 U.S.C. 154(b) by 475 days.

(21) Appl. No.: 13/365,156

(22) Filed: Feb. 2, 2012

(65) Prior Publication Data

US 2013/0202055 A1    Aug. 8, 2013

(51) Int. Cl.
| | |
|---|---|
| H04M 1/66 | (2006.01) |
| H04W 12/06 | (2009.01) |
| H04L 27/26 | (2006.01) |
| H04L 25/02 | (2006.01) |
| H04L 9/32 | (2006.01) |

(52) U.S. Cl.
CPC ........... *H04W 12/06* (2013.01); *H04L 27/2647* (2013.01); *H04L 9/3226* (2013.01); *H04L 25/022* (2013.01); *H04L 25/0212* (2013.01)

(58) Field of Classification Search
CPC ..... H04W 12/06; H04W 48/18; H04W 88/06; H04L 27/2647; H04L 27/10; H04L 5/0007; H04L 63/123
USPC .................... 455/411, 435.2, 552.1; 375/260; 370/278, 208; 713/161
See application file for complete search history.

(56) References Cited

U.S. PATENT DOCUMENTS

| | | | |
|---|---|---|---|
| 2005/0188888 A1* | 9/2005 | Watkins et al. | 102/502 |
| 2005/0276355 A1* | 12/2005 | Chow et al. | 375/340 |
| 2006/0030354 A1 | 2/2006 | Ho et al. | |
| 2006/0112266 A1* | 5/2006 | Little et al. | 713/161 |
| 2006/0281441 A1* | 12/2006 | Okochi | 455/411 |
| 2007/0286192 A1* | 12/2007 | Pantelias | 370/390 |
| 2007/0291635 A1 | 12/2007 | Yang et al. | |
| 2008/0022084 A1* | 1/2008 | Raftelis et al. | 713/153 |
| 2009/0082017 A1 | 3/2009 | Chang et al. | |

(Continued)

FOREIGN PATENT DOCUMENTS

| | | |
|---|---|---|
| TW | 102104062 | 11/2014 |
| WO | WO PCT/US2013/021602 | 4/2013 |

OTHER PUBLICATIONS

"What is Android?" Article at url: file://V:\android-sdk-windows\docs/guide/basics/what-is-android.html, retrieved on Sep. 2010, 612 pages.

(Continued)

*Primary Examiner* — Charles Appiah
*Assistant Examiner* — Alexander Yi
(74) *Attorney, Agent, or Firm* — Orrick Herrington & Sutcliffe LLP (57) ABSTRACT

A software upgrade application can be downloaded to a handset to selectively enable enhanced functionality physical layer circuitry. In a particular implementation, an OFDM handset or other portable modem includes selectively enabled time domain channel estimation circuitry. An upgrade application within the handset is activated. The handset is checked to confirm compatibility with the enhanced functionality and the upgrade application is checked to confirm its authenticity. The upgrade application then activates the enhanced functionality within the physical layer of the device.

10 Claims, 4 Drawing Sheets

(56) References Cited

U.S. PATENT DOCUMENTS

| | | | |
|---|---|---|---|
| 2011/0016053 A1* | 1/2011 | Dittmer | 705/44 |
| 2011/0274014 A1 | 11/2011 | Du et al. | |
| 2013/0055136 A1* | 2/2013 | Aaron et al. | 715/772 |

OTHER PUBLICATIONS

Rizzolo et al., "IBM System z9 eFuse applications and methodology," IBM J. Res. & Dev., Jan./Mar. 2007, pp. 65-75, vol. 51, No. 1/2.

"iOS App Programming Guide" Guide at url: http://developer.apple.com/library/ios /documentation/iphone/conceptual/iphoneosprogrammingguide/iphonecapprograming.pdf, 136 pages.

Hachman, "Verizon API to Give Apps 'Turbo' Bandwidth Boost," Article at url: www.pcmag.com/article/pring/290037, Nov. 1, 2011, 1 page.

* cited by examiner

METHOD AND SYSTEM FOR ACTIVATION OF PERFORMANCE ENHANCEMENTS FOR MOBILE DEVICES

BACKGROUND

1. Field of the Invention

The present invention relates generally to a method and system that allows an end-user to enable functionality in a communications device and, more specifically, that allows an end-user to enable functionality built into the physical (PHY) layer of the communications device.

2. Description of the Related Art

Communication devices like cellular telephones or modems are available using a variety of waveforms for their PHY layer. The PHY layer is the physical, electromagnetic means by which bits of information are transmitted and received over the transmission medium. As sold, most communication devices implement a single variant of PHY layer while more advanced devices will implement more PHY layer protocols to accommodate various types of transmission, such as data as well as voice. For example, some cellular telephones implement a Global System for Mobile Communications or GSM PHY layer and others implement a code division multiple access or CDMA PHY layer. To increase data rates and mitigate multipath, some advanced networks, including so-called 4G wireless networks such as WiMAX (802.16m) and LTE, have adopted variations of orthogonal frequency division multiplexing (OFDM) waveforms for their PHY layer.

OFDM is considered to efficiently use bandwidth but also is considered to be sensitive to channel imperfections and inaccuracies in reception and processing. One of the elements of an OFDM receiver that helps mitigate the potential sensitivities of OFDM systems is an accurate channel estimation algorithm that is embedded in the PHY layer of the communication device. Channel estimation in OFDM systems attempts to model the environment that the received signal has passed through and to use that model to determine one or more filters for the received signal to recognize and recover the transmitted signal accurately. OFDM systems typically utilize frequency domain channel estimation (FDCE) because OFDM processing occurs in the frequency domain and frequency domain channel estimation is consequently comparatively simple. In FDCE, the received signal is converted from the time domain into the frequency domain using a fast Fourier transform (FFT), typically before channel estimation is performed. This makes frequency domain processing for channel estimation both convenient and low complexity. Some academic studies suggest using time domain channel estimation (TDCE) for OFDM systems, which is necessarily complicated to improve the receiver performance.

Modern cellular phones, such as so-called smartphones, typically use one of the mobile operating system (OS) standards known in the art, including for example Google's Android OS, Apple's iPhone OS or iOS, Research in Motion's (RIM) OS, Microsoft's Windows Phone OS, and the like. These smartphones utilizing a mobile OS provide support for third-party software, also referred to as applications. Many network carriers offer their users application stores, or app stores, where users can purchase and download these applications. These applications typically provide entertainment or user interface updates. For example, many applications are available for games that users can play on their communication device. Other examples include user interfaces adapted to browse or update special interest information (for example, desired categories of news or specific social networking sites). Notably, these conventional cellular phone applications do not reconfigure the hardware or enable or disable specific circuitry in the device.

SUMMARY OF THE PREFERRED EMBODIMENTS

An aspect of the present invention provides an OFDM system including a communication device containing a physical layer. The system includes a verifier for determining compatibility of the communication device and a checker for authenticating at least one aspect of the communication device using an authentication key. The physical layer of the communication device includes a switch adapted to enable enhanced functionality in the physical layer when activated.

Another aspect of the present invention provides a method for enabling functionality of a communication device comprising determining compatibility of the communication device with requested enhanced functionality. The method authenticates a software element accessed by the communication device. One or more switches in the physical layer of the communication device is adapted to enable additional functionality in the communication device.

Still another aspect of the present invention provides a method for activating enhanced functionality in a communication device configured to process OFDM signals comprising activating an update application program adapted to enable one of more switches in a physical layer of the communication device. The method includes retrieving an authentication key, receiving financial authorization and outputting indicia of the financial authorization. An authentication and financial authorization result is received. One or more switches in the PHY layer of the communication device is enabled to enable additional functionality in the PHY layer of the communication device upon successful authorization and payment.

BRIEF DESCRIPTION OF THE DRAWINGS

Aspects of the present invention are illustrated in the attached drawings and can be better understood by reference to those drawings in conjunction with the detailed description. The drawings form a part of the disclosure.

DETAILED DESCRIPTION OF THE PREFERRED EMBODIMENTS

Aspects of the present invention can selectively provide enhanced hardware functionality in a communications device in response to an end-user request. A particularly preferred implementation environment is a handset or other modem that implements orthogonal frequency division multiplexing communication. For example, the enhanced hardware functionality might change the channel estimation scheme implemented in the PHY layer of the communication device to thereby allow improved reception and, in some cases, transmission speeds. A handset's end-user might request the enhanced hardware functionality by transmitting a message from the mobile handset to the carrier that provides service to that handset. The carrier preferably processes the request and preferably provides an activation message that is received and processed by the handset to selectively activate the enhanced hardware functionality. In a preferred configuration, the end-user purchases or licenses the enhanced hardware functionality by transmitting the message to the carrier, the carrier confirms the payment and that the end-user handset can provide the requested functionality and activates the hardware for the enhanced functionality. Embodiments of the invention might allow an end-user to enable the enhanced functionality for a desired period of time or number of uses. This implementation has the advantage of allowing users a means to pay for increased performance only when needed.

In an exemplary embodiment, a user that wants to increase the performance of a communication device downloads from an application store a software upgrade application for activating a performance enhancement. The software upgrade application preferably is adapted to operate on the operating system of the communication device. The upgrade application preferably is further adapted to configure the communication device to enable the desired enhanced functionality upon successful activation. The communication device preferably has the desired functionality already built into its hardware, software, firmware, or some combination thereof. Once a user initiates the upgrade application, the communication device verifies that its communication chip (or chips) is compatible with the performance enhancement (in this example the performance enhancement is provided by a PHY layer implementing advanced channel estimation). Optionally, the communication device also verifies the authenticity of the hardware, software, firmware, or some combination thereof, for example using an authentication key stored locally in nonvolatile memory. In this example, a checker compares the locally stored authentication key against a value received from a remote server or embedded in the downloaded software, and returns a result from the comparison. If the communication device is compatible with the performance enhancement and the checker returns a favorable authentication result, the user is prompted to select a period of time or number of uses for the performance enhancement. The user in this example preferably also completes a financial transaction related to the selection of the period or number of uses. The communication device preferably then is reconfigured to use the PHY layer implementing the advanced channel estimation. In some embodiments, the activated upgrade module directly or indirectly alters a switch or setting to enable the enhanced functionality of the communication device. This switch typically is part of the PHY layer of the communication device.

Traditional communication device software applications may provide updated user interfaces, ring-tones, games, and the like. In contrast, embodiments of the present invention preferably use a software update module adapted to reconfigure the existing hardware at the PHY level (an option not normally available to users) by directly communicating with the PHY layer without resort to typical intermediary logical stack levels, such as the network or transport layers. Further, when activation is tied to completing a financial transaction, the cost of the enhanced functionality is passed only to those users desiring to implement it rather than having a communication device or service provider offer only the enhanced configuration at a higher price point. Aspects of the present invention allow greater flexibility to the device vendor, the service provider and the end user. In some embodiments, a user can opt to pay for enhanced performance only when they are using it, adding still further flexibility.

In a presently preferred embodiment the communication device contains a communication chip of a generally known configuration with the exception of the PHY implementation and the software discussed here. Alternative implementations are apparent to those of ordinary skill that are consistent with the teachings and scope of this disclosure. The communication chip may have what is known as a system on a chip configuration known to those skilled in the art or may be implemented as an application-specific integrated circuit (ASIC), digital signal processor (DSP), field-programmable gate array (FPGA), a combination thereof or other known solutions. In an embodiment of the invention, the communication device provides wireless modem functionality of the sort adapted for use in mobile devices, such as smart-phones and tablets utilizing so-called 4G networks or successor networks.

Information on OFDM communication systems and OFDM processing, including channel estimation techniques, is found in co-pending U.S. Application Ser. No. 61/559,793 "OFDM Receiver with Time Domain Channel Estimation" by Steven C. Thompson and Fernando Lopez de Victoria and co-pending U.S. application Ser. No. 12/365,805 "Least Squares Channel Identification for OFDM Systems" by Fernando Lopez de Victoria. Each of U.S. Application Ser. No. 61/559,793 and U.S. application Ser. No. 12/365,805 are incorporated by reference in their entireties including specifically their teachings with respect to OFDM implementations and channel estimation in OFDM systems. As discussed there, conventional OFDM applications use FDCE. Advantages may be realized by using TDCE techniques in OFDM implementations. In a preferred embodiment, the enhanced functionality enabled by activation of one or more switches configures the communication device to use a PHY layer implementing TDCE in an OFDM communication system. It should be understood that the selection of different channel estimation techniques within an OFDM communication system is a presently preferred and particularly advantageous implementation of aspects of the invention. On the other hand, the principles illustrated in this described embodiment can be applied to the widespread distribution and selective activation of varying performance enhancements in communication devices.

The upgrade application may be installed using any of a variety of known methods, including preloading the upgrade application on the communication device, packaging the upgrade application with the device operating system, or making the upgrade application available for download from an "application store" or website. Downloading the upgrade application might be free or, consistent with presently preferred embodiments, might be available for a fee or other form of financial transaction. One convenient implementation is to make the financial transaction part of the application download procedure as is known. Alternatively, the financial transaction may be deferred to setup or initialization of the upgrade application just before the use of the upgrade application to implement the hardware enhancement, rather than at the time of downloading the upgrade application.

In a preferred embodiment, upon initiating the software upgrade application, the upgrade application verifies that the communication device supports the enhanced functionality. For example, the upgrade application verifies that the communication device contains a selectively activatable PHY layer implementing an advanced form of channel estimation such as TDCE in an OFDM system. More specifically, a verifier module within the upgrade application preferably performs authentication. The verifier preferably is implemented in firmware, hardware, software, or some combination thereof. If verification fails, the user is notified that the device does not support the requested enhanced functionality.

If the communication device is compatible and supports the requested enhanced functionality, a checker module preferably verifies the authenticity of the upgrade application or the PHY layer or that the end-user has paid the fee for the enhanced functionality or combinations of these possibilities including checking the authenticity of the upgrade application and the PHY layer and that the end-user has paid the fee. The checker module may be implemented in firmware, hardware, software or some combination thereof. Local memory of the communication device preferably stores one or more authentication keys so that the one or more authentication keys can be accessed by the checker module to determine if the PHY layer or the upgrade application or both is authentic. The authentication keys are defined in conjunction with the communication device provider. For example, each authentication key might be stored in read-only or nonvolatile random-access memory in the communication device. The checker module determines if the one or more authentication keys match reference values, for example, stored on a remote server to prevent unauthorized enablement of the communication device functionality. In preferred embodiments, the checker module preferably controls one or more triggers included as part of the PHY layer switch. If the checker detects a non-authentic upgrade application, the checker module does not set the triggers and the PHY layer cannot be switched to the enhanced functionality. In other configurations, the checker may additionally detect whether a non-authentic PHY layer is present or whether the fee for the enhanced functionality has not been paid. Alternatively, other known authentication protocols and methods may be implemented.

Some embodiments of the software upgrade application preferably include a checker module. Alternatively, the operating system or another software component of the communication device may include a pre-coded checker module. In either alternative, the checker module runs upon activation of the upgrade application. When the checker module is used, it compares the one or more authentication keys stored in local memory with a corresponding one or more predetermined values received from a remote server. Alternatively, the checker module retrieves the one or more authentication keys from local memory and outputs the one or more authentication keys to a remote server so that the remote server performs the authentication. The remote server then returns the favorable or unfavorable authentication result to the sending communication device. Alternatively, an authentication code or software key is provided to a user upon registration or payment (for example after completing a financial transaction) for the additional functionality. In this alternative, during application setup the user is prompted to enter the authentication code. The checker module then compares the entered authentication key with a list of predetermined values stored locally or submits this code or authentication key, such as a software key, to a remote server for authentication. An authentication result is then returned by the verifying device depending on the embodiment, for example by either the remote server or the local device. If a favorable authentication result is returned, the checker module enables activation of the enhanced functionality. If an unfavorable result is returned the checker does not enable the enhanced functionality or, if desired, disables the enhanced functionality so that it cannot be enabled. Optionally, an error message is displayed upon an unfavorable result and optionally provides a method for a user to procure a valid copy or license. For example, the software prompts the user to complete a financial transaction to obtain a license or provides a path to obtain an authorized copy of the software.

Upon successful authentication, the communication device prepares to enable its enhanced functionality. In an embodiment, one or more switches is triggered activating a PHY layer implementing TDCE. After the functionality is enabled, the communication device then reboots and a self test is performed after the reboot. If the self test fails the device is returned to its previous configuration and optionally an error message is displayed. After such a failure the device loads a replica of the original configuration, preferably permanently saved within the communication device, and resumes its prior operation. If the self test is successful the communication device operates in its normal mode, but utilizing the activated functionality of the PHY layer, for example TDCE.

Certain aspects of the present invention allow for a variety of activation times or periods, which optionally are tied to financial transactions related to licensing of the enhanced functionality. In a typical embodiment, the activation is configured to allow unlimited use of the enabled functionality. In another embodiment, the activation is configured to allow a specific number of individual uses, for example one, two, three, or more uses. In yet another embodiment, the activation is configured to allow for periodic use, for example one or more hours, days, weeks, months, or years. In a multiple use configuration, the switch is used in conjunction with built-in timers turning the switch on or off after a set period of time or number of uses.

In a preferred embodiment of the invention, the activation also includes a financial transaction to purchase a license for the enabled functionality, whether as a one-time fee, or based on periodic billing at predetermined intervals based on the number or period of uses activated. For example, during setup of the communication device or initiation of the upgrade application a user might pay a one-time fee to enable the enhanced functionality. In one embodiment, the payment is added to a user's bill for that communication device, for example as a one-time fee added onto a cellular phone bill. Alternatively, during setup the user is directed to a website, whether the communication device carrier's website or a third-party website, to enter payment and authentication information. In the case of periodic activation, a monthly surcharge for the enhanced functionality is billed to the user's monthly service bill, for example the user's monthly cellphone carrier bill. In another implementation, the user is prompted to complete a financial transaction, whether through the device carrier, a website, other means, at the interval(s) determined by the period or number of activations. In the case of authentication using a remote server, such as the communication's carrier servers, optionally, the financial transaction is sent and performed concurrently with authentication.

Figure 1:
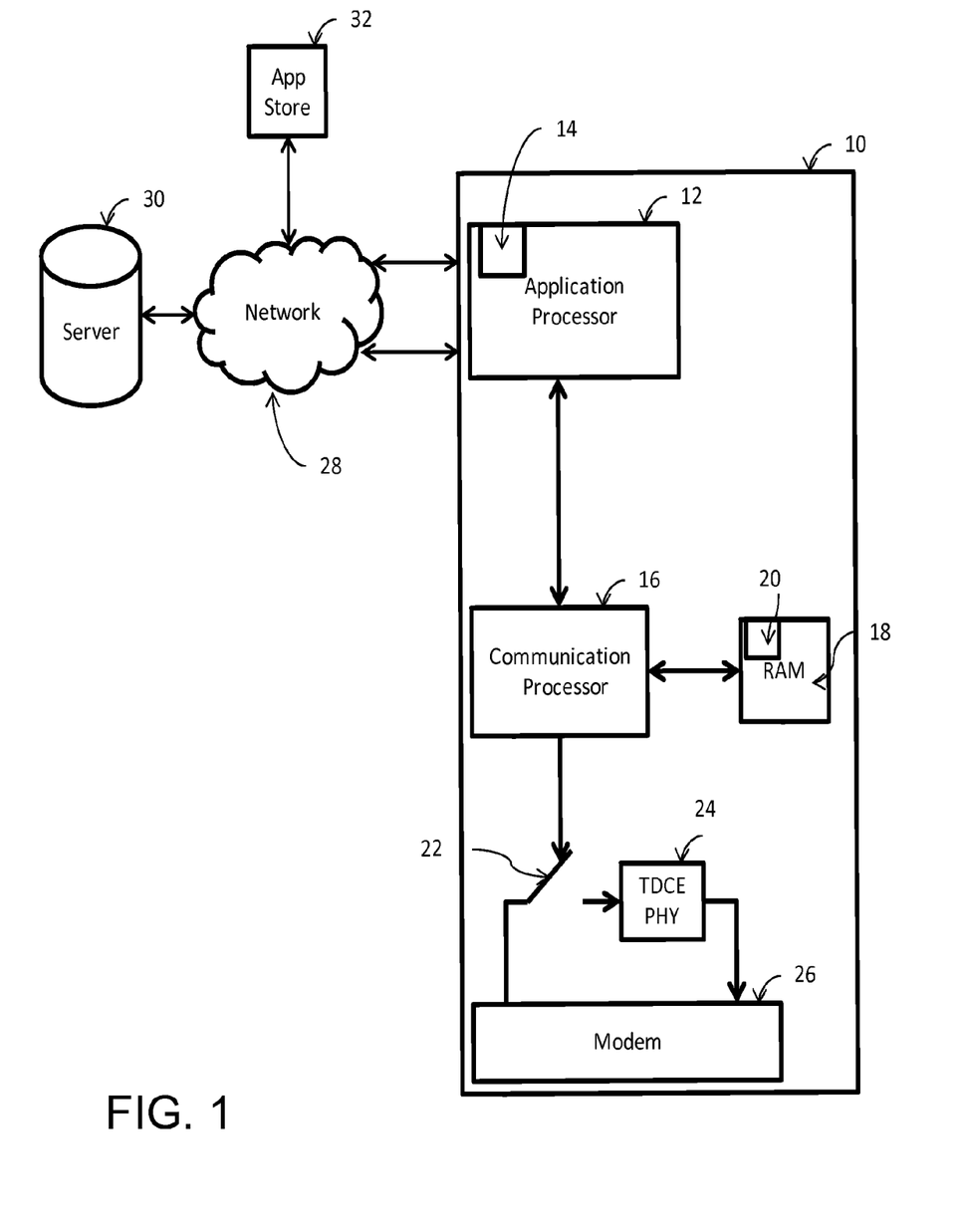
FIG. 1 shows an exemplary block diagram of an embodiment of the invention.
Figure 2:
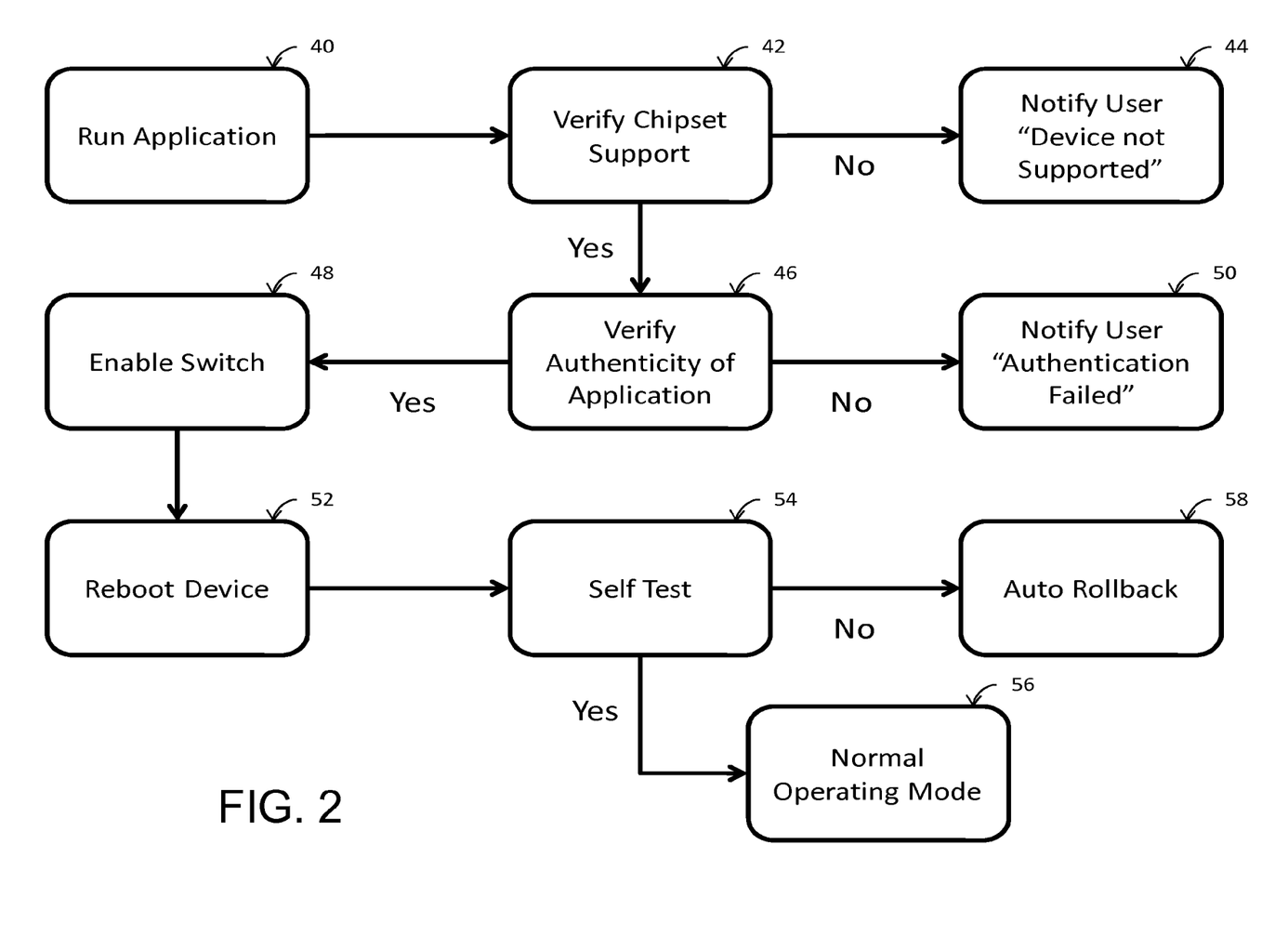
FIG. 2 shows an exemplary diagram of a process flow according to an embodiment of the invention.

FIGS. 1 and 2 illustrate exemplary system and method aspects of the present invention. An exemplary embodiment is described with reference to both figures. For ease of discussion, certain structures are referred to separately for purposes of illustrating aspects of the invention. A modern communication chip may contain each of these elements. For example, the communication chip likely contains one or more physical processors, having one or more cores, performing the functions for what is referred to herein as the logically, but not necessarily physically separate, applications and communication processors. Communication device 10, for example a smart-phone, uses any of a variety of known operating systems (OS) standards. Communication device 10 contains application processor 12, which runs the operating system. Application processor 12 is adapted to run programs including upgrade application 14 within the environment defined by the operating system. Communication device 10 also contains communication processor 16, nonvolatile local memory 18, switch 22, selectable PHY layer 24, modem 26, and a bus. The illustrated modem 26 preferably incorporates a FDCE PHY with circuitry to allow the selectable PHY 24 to be switched into the modem 26. It is understood that a single communication chip may contain each of these elements.

A user that wants to enable enhanced functionality on a communication device 10 might download a software upgrade application to enable the enhanced functionality from a remote server 30 or application store 32. Alternatively, a carrier might preload the communication device 10 with a desired upgrade application 14. After the application processor 12 downloads and installs the upgrade application, the application processor 12 initializes the upgrade application 14 at step 40 (FIG. 2) to run on application processor 12. Next at step 42 the upgrade application 14 verifies the compatibility of the communication device 10 and the upgrade application verifies support of the enhanced functionality provided by selectable PHY layer 24. Alternatively, upgrade application 14 performs step 42 after authenticity verification step 46. Preferably, if the device is not supported the upgrade application 14 causes the communication device 10 to display error message 44. If the device supports the enhanced functionality, the upgrade application 14 causes the checker module to verify 46 the authenticity of the upgrade application 14 or the selectable PHY layer 24. For example, the upgrade application 14 and the checker module cooperate to output one or more preloaded authentication keys 20 retrieved from storage in local memory 24 or to output a user input authentication key (for example one acquired after completing a licensing financial transaction) to remote server 18 over a network 28. An authentication result 46 is then output by the remote server 18 over network 28 for receipt by the communication device 10. If the authentication result 46 is favorable, the checker module within the application processor 12 activates switches 22 enabling the additional enhanced functionality at step 48. If the authentication result 46 is unfavorable, the communication device 10 displays an error message is displayed. Optionally, a user is prompted with an explanation of how to acquire an authentic version of the upgrade application software or to complete a financial transaction to enable the enhanced functionality if the upgrade application software is not authentic. After enablement, the communication device 10 is then rebooted at step 52. After the device reboots, a self-test is preferably performed at step 54. If the self-test is successful the communication device 10 operates in its normal operating mode 56 with the additional functionality provided by enabled PHY layer 24 provided to improve communication device 10's performance. If the self-test fails, the communication device 10 is rolled back 58 to its previous configuration. Preferably the application processor 12 reloads an image of the original configuration that is permanently stored within the communications chip. Optionally, an error message is displayed if the self-test fails.

Figure 3:
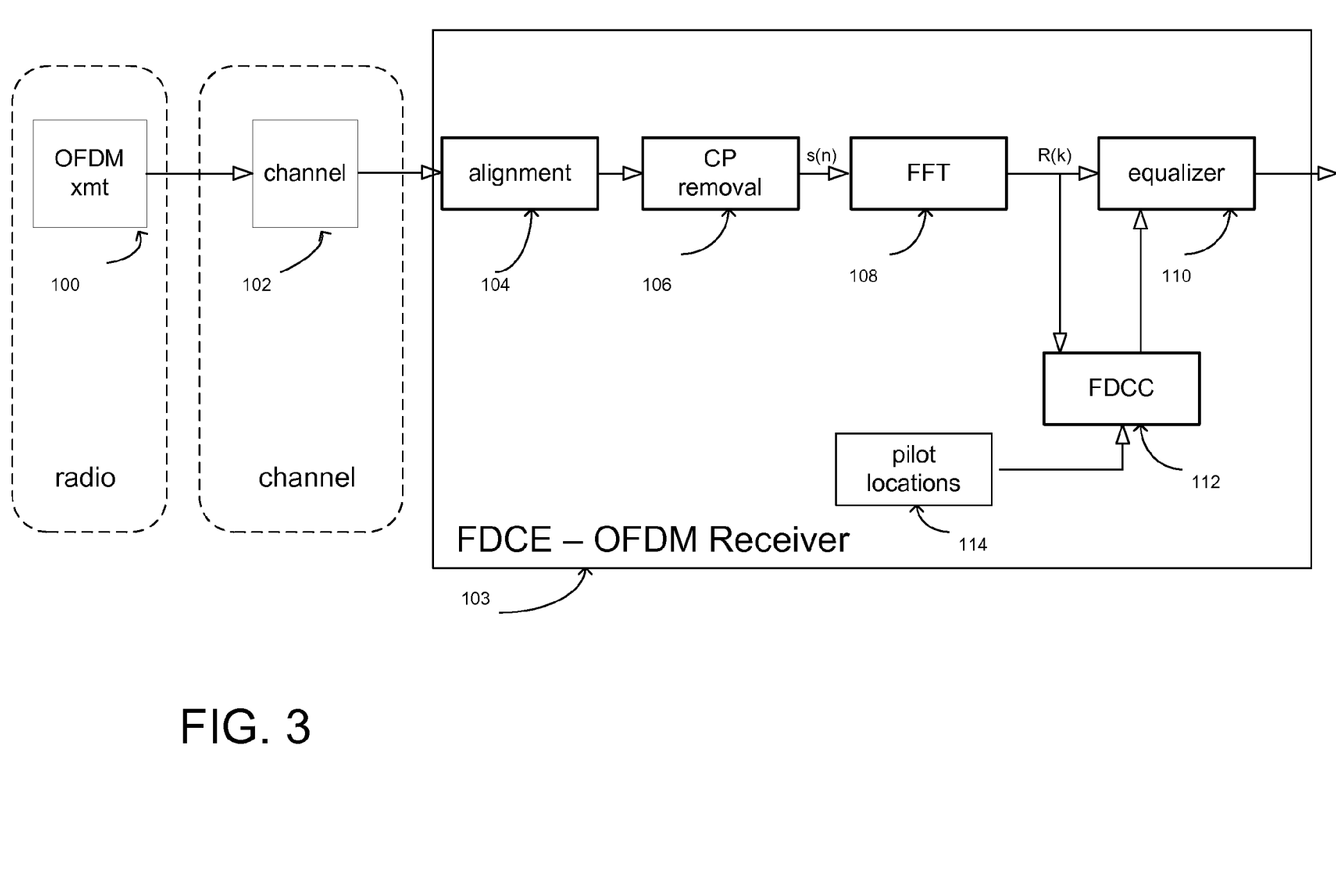
FIG. 3 schematically illustrates an OFDM communication system, including a frequency domain channel estimation OFDM receiver.

FIG. 3 schematically illustrates an OFDM communication system, including an OFDM transmitter 100 that generates a radio signal modulated with information such as data generated by a computer network or voice data. What is shown in FIG. 3 preferably illustrates in part the baseline configuration of the communication device and, in particular, the modem 26. In a particularly preferred embodiment, the communication device 10 includes the PHY layer of both the FIG. 3 circuitry and the FIG. 4 circuitry, with the PHY portion of the FIG. 4 circuit selectable in response to the upgrade application 14. The radio signal travels over the channel 102 to a receiver 103. Channel 102 distorts the radio signal in various ways, including by transmission over multiple paths of different lengths, introducing multiple copies of the radio signal with different offsets and amplitudes in the mechanism known as multipath. OFDM receiver circuitry 103 down converts the received signal to baseband and then analog-to-digital converts that signal to produce the information signal that is input into the OFDM processing circuitry. The radio signal is input to an alignment element 104 that aligns the signal temporally so that it can be processed according to transmission standards. Following the alignment element 104, the signal is passed to a processing element 106 that removes the cycle prefix (CP) from the signal. OFDM transmitter 100 adds a CP of length NCP, which consists of the last NCP samples, to a unique signal waveform of length N so that the digital signal that the transmitter converts to analog and transmits is of length N+NCP. An initial step of the receiver's reverse conversion process then is to remove and discard the added NCP cycle prefix samples. Following that step, a serial to parallel conversion element organizes and converts the serial signal into a parallel signal for further processing. The cycle prefix can be removed either before or after the serial to parallel conversion.

After CP removal 106 the parallel data is provided to an FFT processor 108 that converts the time domain samples s(n) to a set of frequency domain samples Ri(k) for processing. The received OFDM symbol is assumed to be corrupted by the channel, which is assumed for OFDM to introduce amplitude and phase distortion to the samples from each of the carrier frequencies used in the OFDM system. The frequency equalizer (FEQ) 110 applies an amplitude and phase correction specific to each of the frequencies used in the OFDM system to the various samples transmitted on the different frequencies. To determine the correction to be applied by the FEQ 110, the FEQ 110 needs an estimate of the channel's amplitude and phase variations from ideal at each frequency.

A frequency domain OFDM channel estimator 112 used in FIG. 3 receives and estimates a channel based on a set of pilot tone locations 114 or another signal that has predictable characteristics such as known bits and carrier locations. This is termed frequency domain channel estimation or FDCE. The pilot tones are generally dictated by the relevant standards and, based on the received values at the pilot signal locations; the frequency equalizer applies an amplitude and phase adjustment for each of the tones within the frequency domain transform of the received signal. It may be necessary to interpolate from the received information to provide channel estimate information for each carrier or tone. All FDCE implementations react to the FFT output OFDM symbol to extract the pilots. The channel estimate at each pilot may be determined as the amplitude and phase rotation from the ideally expected value of "+1" for each pilot. That is, any deviation from this "+1" value constitutes the distortion from the channel at that frequency's bandwidth. The value of the channel at the data carrier frequencies can be estimated by interpolating the values obtained at the pilot carrier frequencies. The frequency equalizer 110 receives the signals from the fast Fourier transform processor 108 and the channel estimates from the estimator 112 and equalizes the signal. The output of the equalizer 110 is provided to a parallel to serial element that converts the parallel outputs of the equalizer to a serial output user signal and then to a decoder (not illustrated in FIG. 3).

Implementations of a TDCE OFDM receiver can provide lower power consumption for a given level of functionality. OFDM systems implementing TDCE also can offer superior performance, e.g., more robust performance, as compared to OFDM systems implementing FDCE approaches. In this context, robustness is viewed as the ability of the communication system to work in the presence of Doppler, interference or carrier offset conditions. OFDM systems implementing TDCE can be more robust because they may, in preferred implementations, measure the channel using statistical methods or other strategies that minimize the corruption from interference. In contrast, OFDM systems that use frequency-domain channel estimation typically measure the channel through analysis of the received signal after performing an FFT on the received signal. The fast Fourier transform is central to OFDM systems but the FFT also "cements" interference into the processed signal.

Figure 4:
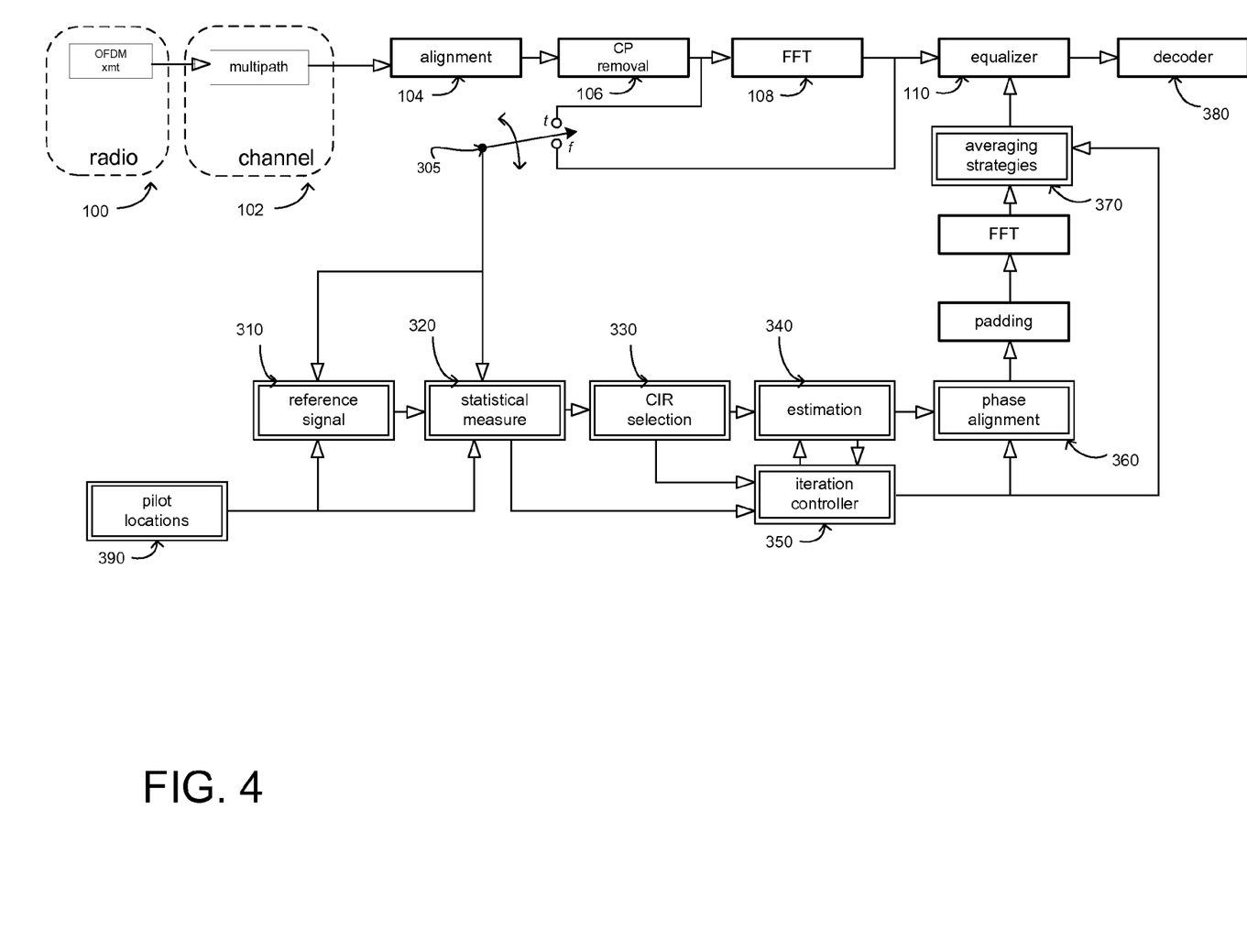
FIG. 4 schematically illustrates an OFDM communication system, including a time domain estimation OFDM receiver.

What is shown in FIG. 4 preferably illustrates in part the enhanced functionality that can selectively switched into the modem 26 circuitry to provide enhanced functionality to the communication device 10. In a particularly preferred embodiment, the communication device includes the PHY layer circuitry of both the FIG. 3 system and the FIG. 4 circuitry and provides a switch that selects the FIG. 4 PHY layer implementation rather than the FIG. 3 implementation as directed by the upgrade application 14. The TDCE OFDM communication system of FIG. 4 performs time domain channel estimation responsive to received symbols before the symbols are processed by a fast Fourier transform. Preferred systems generate a reference signal from at least the pilots and correlate the resulting reference signal with a signal responsive to the received symbol to generate an initial channel impulse response (CIR) and to determine statistics about the channel. In some circumstances, the resulting reference signal is correlated with a modified symbol in which the pilot locations are emphasized and the data locations are deemphasized. In some implementations, time domain channel estimation preferably is responsive to the CIR and channel statistics to iteratively improve on the initial CIR. Preferred aspects of the system determine channel estimates for data only symbols through averaging, with the averaging preferably performed through interpolation or interpolation and extrapolation and preferably performed in the frequency domain.

FIG. 4 is a basic schematic diagram of a TDCE OFDM receiver within an overall OFDM system. As shown in FIG. 3, the FIG. 4 OFDM communication system includes an OFDM transmitter 100 that generates radio signals modulated with information such as data generated by a computer network or voice data. The radio signal travels over the channel 102 to a preferred implementation of a TDCE OFDM receiver. Channel 102 distorts the radio signal in various ways, including by transmission over multiple paths of different lengths, which introduces multiple copies of the radio signal with different offsets and amplitudes in the mechanism known as multipath. The radio signal is down converted and input to an alignment element 104 that aligns the signal temporally so that it can be processed according to transmission standards. Following alignment, the data is passed to a processing element 106 that removes the CP from the signal. Following that step, a serial to parallel conversion element organizes and converts the serial signal into parallel for further processing. The cycle prefix can be removed either before or after the serial to parallel conversion.

After CP removal 106 the parallel data is provided to an FFT processor 108 that converts the time domain samples $s(n)$ to a set of frequency domain samples $Ri(k)$ for processing. The received OFDM symbol is assumed to be corrupted by the channel, which is assumed for OFDM to introduce amplitude and phase distortion to the samples from each of the frequencies used in the OFDM system. A frequency equalizer 110 can apply amplitude and phase correction specific to each of the carrier frequencies used in the OFDM system for the various samples transmitted on the different frequencies. The correction applied by the FEQ 110 preferably uses an estimate of the channel's amplitude and phase variations from ideal with the channel estimation preferably accomplished in the time domain. Certain preferred implementations of the FIG. 4 TDCE receiver determine a channel estimate for every received OFDM symbol. Other preferred implementations use statistical measures to provide robust functionality against known impairments. The equalized symbol output by the frequency equalizer 110 is provided to the decoder 380, which processes the symbol to extract the transmitted data. Appropriate decoders are known in the art.

Portions of the FIG. 4 receiver preferably are selected to facilitate generating a time domain channel estimate. Pilot locations element 390 stores and outputs a set of pilot signal locations. Pilot locations element 390 may output pilot signal locations corresponding to the symbols and subcarriers that the appropriate communication standard dictates as having pilot signals. Reference signal element 310 preferably is responsive to pilot location information output by pilot locations element 390. The reference signal output by element 310 allows for correlations between the reference signal and either a time domain or a frequency domain received signal.

Further information on OFDM communication systems and OFDM processing, including channel estimation techniques, is found in co-pending U.S. Application Ser. No. 61/559,793 "OFDM Receiver with Time Domain Channel Estimation" by Steven C. Thompson and Fernando Lopez de Victoria and co-pending U.S. application Ser. No. 12/365,805 "Least Squares Channel Identification for OFDM Systems" by Fernando Lopez de Victoria. Each of U.S. Application Ser. No. 61/559,793 and U.S. application Ser. No. 12/365,805 are incorporated by reference in their entireties including specifically their teachings with respect to OFDM implementations and channel estimation in OFDM systems. The circuitry illustrated in FIGS. 3 and 4 and further described in the above-referenced and incorporated applications is implemented primarily as hardware in a presently preferred embodiment but, as is known, the illustrated circuitry can be implemented entirely as software within a DSP, a communication processor or even a general purpose processor. Each of these possible implementation environments for frequency domain and time domain channel estimation should be considered to be circuitry for the purposes of this disclosure and claims.

In an exemplary implementation, a communication device runs a software update application to enable additional enhanced functionality in a communication device. The application could be developed using any of a variety computer languages adapted to operate on a device utilizing one or more operating system (OS) standards known to those skilled in the art, including Google's Android OS, Apple's iPhone OS or iOS, Research in Motion's (RIM) OS, Microsoft's Windows Phone OS, and the like. The application is adapted to communicate with chip's PHY layer without resort to typical intermediary layers, such as the network or transport layers. For example, the update application running within the application processor verifies that the communication chip in the device has an optionally selectable PHY layer with enhanced functionality because it implements TDCE. The PHY layer is in a part of the chip physically and logically separate from the application processor. The update application verifies the communication device is compatible and supports the desired functionality using, for example, a verification module. A checker module, or some functionally equivalent component, authenticates that the user is entitled to use performance enhancing functionality. For example, the checker module determines if the software application is properly licensed. Alternatively, the checker module verifies that the user completed a financial transaction tied to the desired period or number of uses. Once support and authenticity is verified the update application running within the operating system on the application processor causes a switch to be turned on to enable a PHY layer implementing a TDCE scheme and, at the same time, disable a PHY layer implementing a FDCE scheme.

In another embodiment, enabling the enhanced functionality is initiated remotely. For example, a user desiring enhanced functionality contacts his or her network carrier. The network carrier then sends an activation signal to the user's communication device. In this embodiment, the high level upgrade application for enabling the functionality is preloaded on the communication device. Upon receipt of the remote activation signal, the preloaded upgrade application then activates one or more switches within the PHY layer of the communication device to enable the performance enhancing functionality.

The present invention has been described in terms of certain preferred embodiments. Those of ordinary skill in the art will appreciate that various modifications and alterations could be made to the specific preferred embodiments described here without varying from the teachings of the present invention. Consequently, the present invention is not intended to be limited to the specific preferred embodiments described here but instead the present invention is to be defined by the appended claims.

What is claimed is:

1. An OFDM system, comprising: a mobile communication device containing a physical (PHY) layer and an application layer; a verifier, responsive to the device user input from the application layer of the communication device, for determining compatibility of the mobile communication device with a requested physical layer enhancement; a checker for authenticating at least one aspect of the mobile communication device using an authentication key to determine eligibility, for the requested physical layer enhancement; and a switch within the physical layer of the mobile communication device adapted to enable, by directly communicating with the physical layer, enhanced functionality in the physical layer of frequency domain channel estimation or time domain channel estimation selected by the user when activated for a period of time or a number of uses by the user's selection, the switch responsive to compatibility, as evaluated by the verifier and eligibility as determined by the checker.

2. The OFDM system of claim 1, wherein the physical layer implements time domain channel estimation that is selectively enabled in response to activation of the switch.

3. The OFDM system of claim 1, wherein the OFDM communications system is a smart-phone.

4. The OFDM system of claim 1, wherein the authentication key is stored in nonvolatile memory.

5. The OFDM system of claim 1, wherein the physical layer comprises frequency domain channel estimation and time domain channel estimation circuitry and wherein the switch selects between frequency domain channel estimation and time domain channel estimation circuitry.

6. A method for enabling functionality of a mobile communication device, comprising: determining, in response to the device user input at an application layer of the mobile communication device, compatibility of the mobile communication device with requested additional physical (PHY) layer functionality for the mobile communication device; authenticating a software element accessed by the mobile communication device to determine eligibility for the additional physical layer functionality; and enabling, by directly communicating with the physical layer, one or more switches at a physical layer of the mobile communication device when activated for a period of time or a number of uses by the user's selection, the one or more switches adapted to enable the additional physical layer functionality of frequency domain channel estimation or time domain channel estimation selected by the user in the communications device in response to the determining and the authenticating.

7. The method of claim 6, wherein authenticating the communication device further comprises:
retrieving a key from local memory;
outputting the key to a remote device; and
receiving an authentication result from the remote device.

8. The method of claim 6, wherein the authenticating the communication device further comprises:
retrieving a key from local memory;
comparing the key value with a list of authentic key values; and
outputting an authentication result if the key value matches the value of an entry in the list of authentic key values.

9. The method of claim 6, wherein the authenticating the communication device further comprises completing a financial transaction.

10. A method for activating enhanced functionality in a mobile communication device configured to process OFDM signals, comprising: activating an update application program adapted to request additional physical (PHY) layer functionality by enabling one or more switches in a physical layer of the mobile communication device; determining, in response to the device user input at an application layer of the mobile communication device, compatibility of the mobile communication device with a requested additional physical layer functionality for the communication device; retrieving an authentication key associated with requested additional functionality in the physical layer of the mobile communication device; receiving financial authorization for the requested additional functionality in the physical layer of the mobile communication device; outputting indicia based on the authentication key and indicia of the financial authorization; receiving an authentication and financial authorization result; and enabling one or more switches in the physical layer of the mobile communication device when activated for a period of time or a number of uses by the user's selection adapted to enable, by directly communicating with the physical layer, additional functionality of frequency domain channel estimation or time domain channel estimation selected by the user in the physical layer of the mobile communication device upon successful authentication and payment.

* * * * *